(12) United States Patent
Devengenzo

(10) Patent No.: US 9,919,424 B1
(45) Date of Patent: Mar. 20, 2018

(54) ANALOG CONTROL SWITCH FOR END-EFFECTOR

(71) Applicant: X Development LLC, Mountain View, CA (US)

(72) Inventor: Roman Devengenzo, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 274 days.

(21) Appl. No.: 14/809,913

(22) Filed: Jul. 27, 2015

(51) Int. Cl.
*G05B 19/04* (2006.01)
*G05B 19/18* (2006.01)
*B25J 9/16* (2006.01)
*B25J 9/00* (2006.01)
*B25J 13/02* (2006.01)

(52) U.S. Cl.
CPC ............ *B25J 9/1656* (2013.01); *B25J 9/0087* (2013.01); *B25J 9/1676* (2013.01); *B25J 13/02* (2013.01)

(58) Field of Classification Search
CPC ...... B25J 9/1656; B25J 9/0087; B25J 9/1676; B25J 13/02; G06Q 30/02
See application file for complete search history.

(56) References Cited

U.S. PATENT DOCUMENTS

| 4,263,538 | A | | 4/1981 | Richiardi | |
|---|---|---|---|---|---|
| 4,795,296 | A | * | 1/1989 | Jau | B25J 13/02 244/223 |
| 6,502,877 | B2 | | 1/2003 | Schick et al. | |
| 7,176,399 | B2 | | 2/2007 | Graiger et al. | |
| 7,481,330 | B2 | | 1/2009 | Lorthioir et al. | |
| 7,783,384 | B2 | * | 8/2010 | Kraft | B25J 13/02 414/2 |
| 8,060,403 | B1 | * | 11/2011 | Grossblatt | G06Q 30/02 705/14.49 |
| 8,667,860 | B2 | * | 3/2014 | Helmer | B25J 13/02 74/490.01 |
| 8,965,576 | B2 | * | 2/2015 | Chen | B25J 9/0087 700/255 |
| 8,996,167 | B2 | | 3/2015 | Linder et al. | |
| 8,996,174 | B2 | | 3/2015 | Brooks et al. | |
| 2010/0188034 | A1 | * | 7/2010 | Young | B25J 9/1656 318/568.14 |

(Continued)

OTHER PUBLICATIONS

Chin-Pao Hung and Wei-Ging Liu, "Intuitive Embedded Teaching System Design for Multi-Jointed Robots," International Journal of Advanced Robotic Systems, dated Apr. 19, 2012, 7 pgs.

*Primary Examiner* — Rachid Bendidi
(74) *Attorney, Agent, or Firm* — McDonnell Boehnen Hulbert & Berghoff LLP

(57) ABSTRACT

Example methods and systems are disclosed for performing automated tasks with a robot system. In one example, a robot system includes a robotic arm and an end-effector coupled to the robotic arm. The end-effector is actuatable among more than two states of actuation. The robot system also includes an analog control switch located on the end-effector. The analog control switch is actuatable among more than two switch positions. The analog control switch is configured such that actuation of the analog control switch among the more than two switch positions causes a corresponding actuation of the end-effector among the more than two states of actuation.

20 Claims, 5 Drawing Sheets

(56) References Cited

U.S. PATENT DOCUMENTS

| | | | |
|---|---|---|---|
| 2013/0345863 A1* | 12/2013 | Linder | B25J 9/0087 |
| | | | 700/246 |
| 2013/0345869 A1* | 12/2013 | Chen | B25J 9/0087 |
| | | | 700/255 |
| 2013/0345872 A1* | 12/2013 | Brooks | B25J 9/0087 |
| | | | 700/259 |
| 2014/0005682 A1* | 1/2014 | Worrell | A61B 17/320092 |
| | | | 606/130 |
| 2014/0012415 A1 | 1/2014 | Benaim et al. | |
| 2014/0192020 A1 | 7/2014 | Helmer et al. | |
| 2015/0290809 A1* | 10/2015 | Nakagawa | B25J 9/1676 |
| | | | 700/258 |

* cited by examiner

ANALOG CONTROL SWITCH FOR END-EFFECTOR

BACKGROUND

Unless otherwise indicated herein, the materials described in this section are not prior art to the claims in this application and are not admitted to be prior art by inclusion in this section.

Robots can be utilized to perform a variety of tasks involving repetitive, automated movements and manipulations of physical objects. For example, robots are commonly employed to spray paint, weld, and/or assemble various devices and products. Additionally, for example, robots are often used in pick-and-place processes or, more generally, to pick up objects at a first location and set them down at a second location. To achieve such functionalities, robots may include a movable arm on which an end-effector is attached. The end-effector is a device designed to interact with an environment and may take a number of different forms depending on the type of task that is to be performed by the robot. For example, a robot designed to pick up, move, and set down objects may include a gripper having a plurality of gripper fingers that controllably open and close.

A robot typically has to be trained to enable the robot to perform a desired task. To do so, the robot can be provided with positional data that specifies locations for one or more components of the robot and procedure data that specifies movements between the specified locations and/or tasks to be performed at the locations. According to one training approach, an operator programs the robot using a graphical user interface or text-based commands; however, this approach can be complex and require a high level of operator skill.

According to another training approach, the robot is trained by the operator physically grabbing the robotic arm and manually maneuvering it along a desired path as the robot records such movements. To operate the end-effector at one or more points on the path, the operator utilizes a remote control device such as, for example, a computer or a teaching pendant. The remote control device is separate and remotely located relative to the robot device. The remote control device generally includes buttons, joysticks, levers, a touchscreen, etc. that allow the operator to actuate the end-effector. For example, an operator can teach a robot to pick up an object by first manually moving the arm into alignment with the object, then using a remote control device to actuate a gripper attached to the robotic arm to close around the object, and then manually moving the robot with the object in its grip. There can also be buttons on the arm at places other than the gripper, which are used to open/close the gripper. However, these buttons are commonly binary on/off buttons.

SUMMARY

Conventional robot systems can be clumsy and inefficient for the operator to teach the robot. For example, an operator may need to step away from the robot in order to actuate the end-effector with a remote control and then return to the robot to check whether the end-effector has been properly positioned by that actuation. If the end-effector is not properly positioned, the operator may need to again step away from the robot to further actuate the end-effector and then return to again check the position. This process may be repeated until the end-effector is properly positioned.

According to aspects of the present disclosure, a robot system is disclosed which can be trained and operated in a more efficient, convenient, intuitive, and safe manner than conventional systems. This is achieved, at least in part, by locating a control switch on the end-effector itself so that the operator can conveniently actuate the end-effector without having to step away (or, in some cases, even remove his or her hands) from the robot system. According to additional aspects, the control switch can be an analog control switch which when actuated causes a corresponding amount of actuation of the end-effector. According to additional or alternative aspects, the robot system can also include an enabling switch to improve operator safety and/or a feedback system to convey meaningful information to the operator during training of the robot system.

According to one embodiment of the present invention, a robot system includes a robotic arm and an end-effector coupled to the robotic arm. The end-effector is actuatable among more than two states of actuation. In general, a state of actuation may be defined as a particular condition that the end-effector is in at a given time. The robot system also includes an analog control switch located on the end-effector. The analog control switch is actuatable among more than two switch positions. The analog control switch is configured such that actuation of the analog control switch among the more than two switch positions causes a corresponding actuation of the end-effector among the more than two states of actuation.

According to additional or alternative embodiments of the present invention, the robot system further includes an enabling switch that is configured to prevent operation of the end-effector using the control switch unless the enabling switch is simultaneously actuated, and/or a feedback system configured to determine and provide an indication of an amount of force applied by the end-effector to an object in response to the actuation of the control switch.

According to another embodiment of the present invention, a method of operating a robot system includes activating a training mode for the robot system. The robot system includes a robotic arm, an end-effector coupled to the robotic arm, and an analog control switch located on the end-effector. The method also includes manually moving the end-effector along a path and actuating the end-effector via the analog control switch at one or more points along the path. The actuating the end-effector includes actuating the analog control switch to a switch position selected from more than two switch positions to cause a corresponding actuation of the end-effector among more than two states of actuation. Additionally, the method includes recording, via one or more controllers, the movements and the actuations of the end-effector.

These as well as other aspects, advantages, and alternatives, will become apparent to those of ordinary skill in the art by reading the following detailed description, with reference where appropriate to the accompanying drawings.

Figure 1:
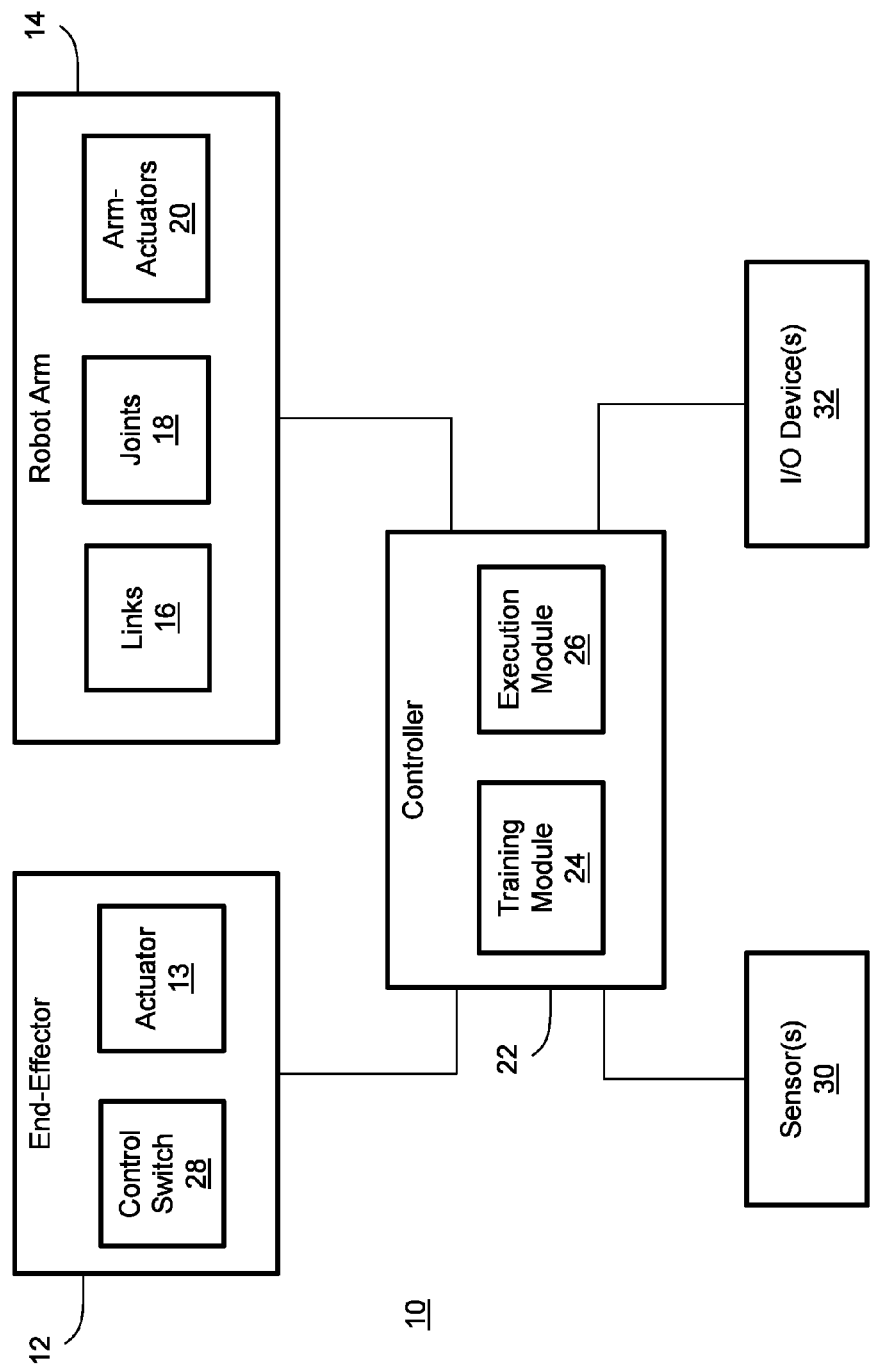
FIG. 1 illustrates a schematic diagram of an example robot system according to aspects of the present disclosure.

While the invention is susceptible to various modifications and alternative forms, specific embodiments have been shown by way of example in the Figures and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims. It should be understood that other embodiments may include more or less of each element shown in a given Figure. Further, some of the illustrated elements may be combined or omitted. Yet further, an example embodiment may include elements that are not illustrated in the Figures.

DETAILED DESCRIPTION

The following detailed description describes various features and functions of the disclosed systems and methods with reference to the accompanying figures. In the Figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

I. Overview

The present disclosure provides a robot system having an improved user interface for training the robot system to perform one or more specific, repeatable tasks. In particular, the robot system of the present disclosure includes a control switch integrated with an end-effector to facilitate operation of the end-effector during a training mode. During the training mode, an operator physically grabs the robot and manually maneuvers it through a series of actions, which can include one or more actuations of the end-effector. By locating the control switch on the end-effector, the operator can conveniently actuate the end-effector without having to step away (or, in some cases, even remove his or her hands) from the robot. As such, the robot systems of the present disclosure can be more rapidly and efficiently trained to perform various tasks.

The robot system of the present disclosure can also provide a more intuitive user interface with greater control over actuation of the end-effector while training the robot system. For example, according to additional aspects of the present disclosure, the control switch can be an analog control switch. The analog control switch is a switching device capable of switching or routing analog signals at any level within a specified range of signal levels (e.g., between zero and a max level).

As described above, training of the robot system of the present disclosure is accomplished by direct user interaction with the robot system. Generally, the safety of an operator is a concern whenever such direct interaction between human and machine occurs. Advantageously, the user interface provided for the robot system of the present disclosure can improve operator safety according to further aspects of the present disclosure. In particular, for example, the robot system can include an enabling switch configured to prevent operation of the end-effector, via the control switch, unless the enabling switch is simultaneously actuated. To further facilitate efficient training of the robot system, the enabling switch can also be integrated with the end-effector.

In addition to improving the inputs for operating an end-effector in a training mode, the user interface provided by the robot system of the present disclosure can also include an improved output mechanism for rapidly, conveniently, and efficiently providing meaningful information to the operator relating to the end-effector during training. In particular, for example, training of the robot system can be further facilitated by providing the operator with an indication as to the amount of force applied by the end-effector to an object being manipulated by the end-effector. Knowing the force applied to an object, the operator can readily adjust the end-effector as desired or based on various parameters or conditions associated with the object. According to some implementations, this information can be provided directly to the operator from the end-effector itself so that the operator need not step away (or, in some cases, even remove his or her hands) from the end-effector.

II. Example Robot System

Referring now to FIG. 1, a schematic diagram is illustrated of an example robot system 10 according to aspects of the present disclosure. As shown in FIG. 1, the robot system 10 includes an end-effector 12 coupled to a robotic arm 14. The end-effector 12 is configured to perform one or more specific tasks desired of the robot system 10. For example, the end-effector 12 can include a parallel two-finger gripper, a three-finger gripper, a multi-fingered dexterous hand gripper, an angled gripper, or a specialty gripper (i.e., customer designed) to manipulate or move objects from one location to another. As additional non-limiting examples, the end-effector 12 can include a welding gun, a spot welder, a spray gun, a grinding device, a deburring device, a drill device, a saw device, a measuring device, etc.

To facilitate movement and/or actuation of the end-effector 12, the end-effector 12 can include one or more actuators 13. For example, the actuator(s) 13 can include one or more motors that are configured to actuate a gripper between a closed-gripper position and an open-gripper position. More generally, the one or more actuators 13 can include one or more vacuum devices, pneumatic devices, hydraulic devices, and/or servo-electric devices configured to actuate the end-effector 12 between a plurality of states of actuation.

The robotic arm 14 can include a plurality of links 16 that are coupled to one another by one or more joints 18 to form a kinematic chain. Each joint 18 can be configured to facilitate at least one of rotational motion or translational displacement of one link 16 coupled to that joint 18 relative to another link 16. For example, the one or more joints 18 can include one or more rotational joints, linear joints, twisting joints, orthogonal joints, and/or revolving joints. As a result, the robotic arm 14 can be configured to adjust a position and/or an orientation of the end-effector 12 with between one and six degrees of freedom (i.e., up to three degrees of freedom for translation and up to three degrees of freedom for rotation) according to aspects of the present disclosure.

To controllably move the robotic arm 14 as described above, the robotic arm 14 can further include one or more arm-actuators 20 coupled to the links 16 and/or the joints 18. For example, the one or more arm-actuators 20 can include one or more vacuum devices, pneumatic devices, hydraulic devices, and/or servo-electric devices.

The end-effector 12 and the robotic arm 14 are communicatively coupled to one or more controllers 22 configured to control the motion of the robotic arm 14 and the actuation of the end-effector 12. In particular, the controller(s) 22 can be configured to provide control signals, via wired or wireless communications, to the one or more actuators 13 and/or the one more arm-actuators 20 to responsively actuate the end-effector 12 and/or move the robotic arm 14 in an intended manner.

As described above, the robot system 10 of the present disclosure is configured to be operated in a training mode in which the robot system 10 learns how to perform a desired task. Accordingly, as shown in FIG. 1, the controller(s) 22 can include a training module 24 configured to facilitate operation of the robot system 10 in the training mode. After the robot system 10 learns a task via the training mode, the robot system 10 can be operated in an execution mode in which the robot system 10 performs the task with minimal or no human interaction. As such, the controller(s) 22 can also include an execution module 26 that is configured to facilitate operation of the robot system 10 in the execution mode during which the robot system 10 performs the tasks learned, at least in part, via the training mode. These and other functionalities of the controller(s) 22 will be described in greater detail below.

As shown in FIG. 1, the end-effector 12 further includes a control switch 28 that is configured to control actuation of the end-effector 12 while the robot system 10 is operated in the training mode. The control switch 28 is located on the end-effector 12, which provides a number of advantages described in further detail below. As non-limiting examples, the control switch 28 can be rocker switch, a multi axis joystick, a selector switch (e.g., a rotary knob), a deformable membrane switch, an analog pushbutton switch, combinations thereof, and/or the like.

According to aspects of the present disclosure, the control switch 28 is configured to be actuated among more than two different switch-positions that each correspond to a respective one of more than two different states of actuation for the end-effector 12. For example, a gripper can include two parallel fingers that are each configured to be positioned at a plurality of finger-positions between an open-gripper position and a closed-gripper position, and each of those finger-positions can be associated with a respective one of the switch-positions for the control switch 28. In this way, the amount that the gripper is opened or closed can be controlled by the control switch 28.

According to some implementations, the control switch 28 can be an analog control switch. As noted above, the analog control switch 28 is a switching device capable of switching or routing analog signals at any level within a specified range of signal levels (e.g., between zero and a max level). The analog control switch 28 can have more than two switch positions to actuate the end-effector 12 among more than two states of actuation. And, in some implementations, the analog control switch 28 can be configured to actuate the end-effector 12 over a continuous range of states of actuation. The analog control switch 28 of the present disclosure is thus in contrast to control switches that can control actuation between only two states. Advantageously, the analog control switch 28 can facilitate actuation of the end-effector 12 with greater granularity and speed control (in free space) than other types of control switches. This can be particularly useful for certain types of applications where a fine and precise control of the end-effector 12 is desired (e.g., when handling fragile or delicate objects).

In some examples, the analog control switch 28 can be configured such that actuation of the analog control switch 28 is linearly related to the amount of responsive actuation of the end-effector 12. Stated differently, the analog control switch 28 can be configured such that actuation of the analog control switch 28 causes a correspondingly proportional amount of actuation of the end-effector 12. As used herein, "correspondingly proportion" is defined to mean that actuation of the control switch by an amount X between a first-switch position and a second-switch position actuates the end-effector by the same amount X between a first state of actuation and a second state of actuation. For instance, in the illustrated example where the end-effector 12 is a gripper, actuation of the control switch 28 between a closed switch-position and an open switch-position can cause a correspondingly proportional opening or closing of the gripper in free space or a correspondingly proportional change in force or torque when engaged with an object (e.g., if the analog control switch 28 is actuated to a position that is X percent between the closed-switch position and the open-switch position, the gripper is correspondingly actuated to a position that is X percent between a closed-gripper position and an open-gripper position). Such example implementations can, for example, provide the user with a more intuitive user interface for training the robot system 10. Indeed, when actuation of the control switch 28 causes a correspondingly proportional actuation of the end-effector 12, the operator is provided with a more consistent and appreciable sense of how much more or less the operator can or should actuate the control switch 28 to achieve a desired amount of actuation of the end-effector 12.

In other examples, the analog control switch 28 can be configured such that actuation of the analog control switch 28 is nonlinearly related to the amount of responsive actuation of the end-effector 12. In such examples, the amount of actuation of the end-effector 12 that occurs responsive to actuation of the analog control switch 28 may vary over different ranges of switch positions for the analog control switch 28. For instance, the analog control switch 28 may provide more coarse control of the end-effector 12 over an initial range of switch positions and more fine control of the end-effector 12 over a subsequent range of switch positions. This may allow, for example, an operator to have more fine control in scenarios where an end-effector is more likely to be interacting with an object and more coarse control in other scenarios. In some instances, a plurality of different scaling factors can be applied to the analog signal levels outputted by the analog control switch 28 over different portions of the range of switch positions to achieve a nonlinear relationship.

Although the illustrated example includes a gripper, it also should be appreciated that the described analog control switches can similarly be employed for other types of end-effectors 12. For example, a spray painting end-effector can have a nozzle, which can be opened or closed by various amounts to control how much paint is applied to an object at a given time. In one non-limiting implementation, the amount the nozzle is opened or closed can correspond to the actuation of an analog control switch 28 between an open-switch position and a closed-switch position. Thus, if the analog control switch 28 is actuated Y percent between the open-switch position and the closed-switch position, the nozzle can be correspondingly actuated Y percent between an open-nozzle position and a closed-nozzle position.

In one example implementation, the analog control switch 28 can include a Hall-Effect sensor configured to output an electrical parameter (e.g., voltage) that corresponds to the amount the control switch 28 is actuated. The output of the Hall-Effect sensor can then be used to limit the amount of current (or voltage) that is provided to the actuators 13 to actuate the end-effector 12. It should be understood that other examples of analog switches are possible as well.

As shown in FIG. 1, the robot system 10 further includes a plurality of sensors 30 that are configured to perceive one or more aspects relating to the state of the robot system 10 and/or the environment in which the robot system 10 is deployed. In particular, the plurality of sensors 30 can be employed by the robot system 10 to determine information that can be utilized during the training mode to learn new tasks and/or during the execution mode to carry out learned tasks. As non-limiting examples, the sensors 30 can include optical sensors (e.g., cameras), displacement sensors, pressure sensors, ultrasonic sensors, acceleration sensors (e.g., accelerometers), gyroscopes, torque sensors, electrical sensors, magnetic sensors, temperature sensors, combinations thereof, and/or the like.

According to some aspects, the sensors 30 can be communicatively coupled to the controller(s) 22 to facilitate a detection and determination of the position and/or orientation of the robotic arm 14 and the end-effector 12 during the training mode and the execution mode. For instance, as an operator moves the robotic arm 14 and/or actuates the end-effector 12 in the training mode, the sensors 30 can provide corresponding signals, which can be processed by the controller(s) 22 to learn a new task. Additionally, in the execution mode, the signals provided by the sensors 30 to the controller(s) 22 can be utilized as input information which can allow the controller(s) 22 to (i) provide responsive control signals to execute the learned task and/or (ii) detect errors in the execution of the learned task. In other words, the controller(s) 22 can monitor the state of the end-effector 12 and the robotic arm 14 based on the signals provided by the sensors 30 to the controller(s) 22.

According to additional or alternative aspects, the sensors 30 can be configured to detect the presence and determine the location of an object with which the end-effector 12 is programmed to interact. For example, the robot system 10 can include a visual sensor configured to recognize the position, orientation, and/or directional velocity of an object so that corresponding data can be determined by the one or more controllers 22, which in turn can be utilized to control the robotic arm 14 and end-effector 12 so as to manipulate the object.

Although the sensors 30 are illustrated in FIG. 1 as being separate from the end-effector 12 and the robotic arm 14, one or more of the sensors 30 can be integrated with the end-effector 12 and/or the robotic arm 14 according to additional or alternative aspects of the present disclosure.

In addition to the sensory inputs provided by the sensors 30 and the operator input provided by the control switch 28, the robot system 10 can further include one or more input/output devices 32 that are configured to receive additional inputs from the operator and/or provide outputs to the operator. For example, the input/output device(s) 32 can include a mouse and keyboard, a joystick, a button panel, a touchscreen display, a dedicated display device, an audio speaker, a voice recognition interface, etc. The input/output device(s) 32 can be utilized to, for example, convey system diagnostics to the operator, confirm or modify aspects of a learned task, operate the robot system 10 in the execution mode, and/or transition the robot system 10 between the execution mode and the training mode.

According to some aspects of the present disclosure, the input/output device(s) 32 can include a portable handheld device such as, for example, a tablet computer or other smart device. Additionally, for example, the input/output device(s) 32 can include a personal computer. According to additional or alternative aspects, one or more the input/output device(s) 32 can be located on or embedded in the robotic arm 14.

Figure 2:
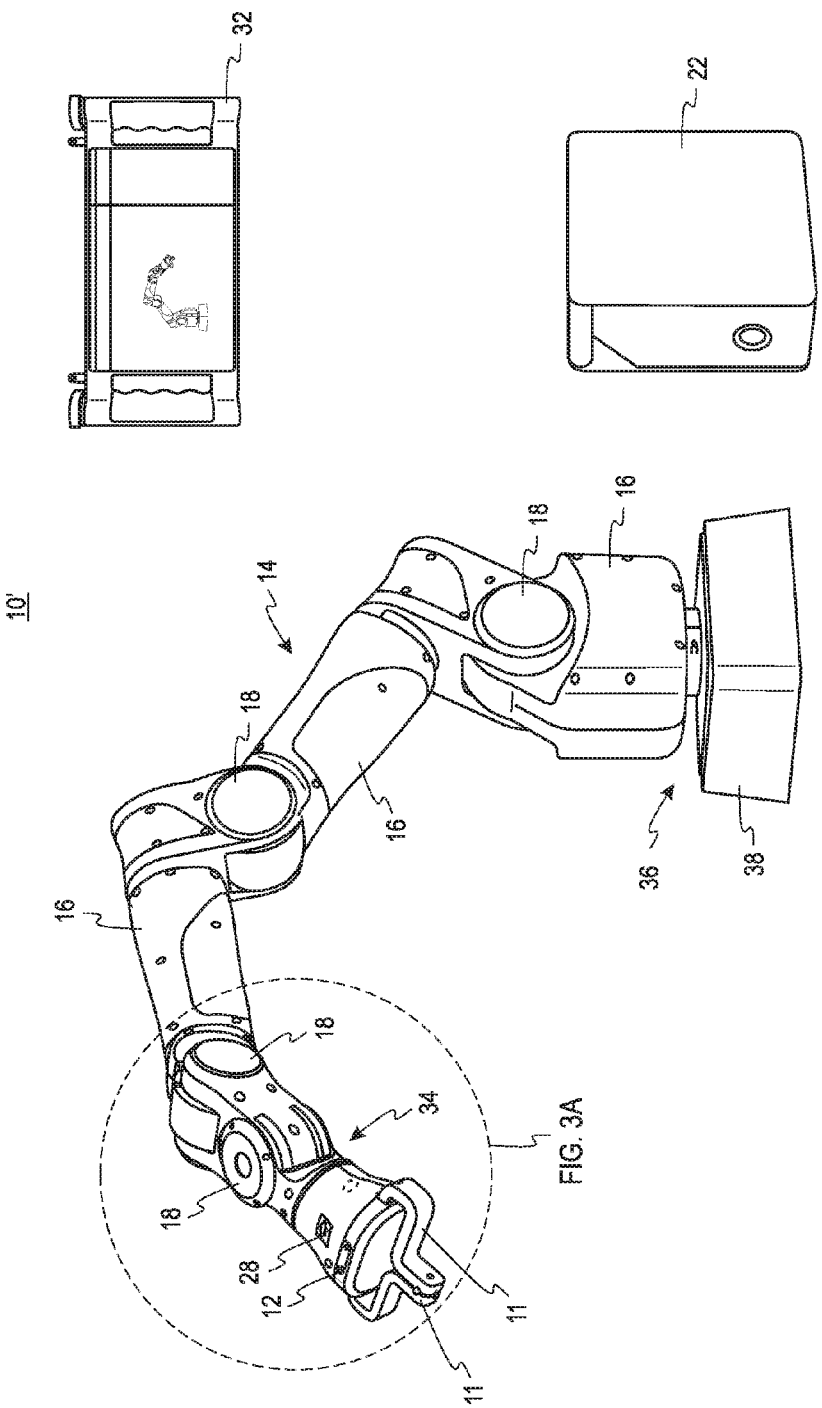
FIG. 2 illustrates a perspective view of an example robot system according to aspects of the present disclosure.

Referring now to FIGS. 2-3, an example robot system 10' is illustrated according to aspects of the present disclosure. The robot system 10' is illustrated as having a gripper; however, it will be understood that other types of end-effectors 12 can be employed according to alternative examples.

The robot system 10' includes a robotic arm 14 removably coupled to a gripper 12' at a first end 34 of the robotic arm 14. The illustrated gripper 12' has two gripper-fingers 11 configured as a parallel, dual-fingered gripper. Although not illustrated, it is contemplated that the robot system 10' can include a plurality of additional end-effectors 12 that can be interchangeably coupled to the first end 34 of the robotic arm 14 according to some additional aspects of the present disclosure. The additional end-effectors 12 can be of any of the example types described above (e.g., three-finger gripper, a multi-fingered dexterous hand gripper, an angled gripper, or a specialty gripper, a welding gun, a spot welder, a spray gun, a grinding device, a deburring device, a drill device, a saw device, a measuring device, etc. As such, the robot system 10' can be configured to be repurposed for various different tasks by swapping the illustrated gripper 12' with one of the additional end-effectors 12 more well suited for a new task to be taught to and executed by the robot system 10'.

The robotic arm 14 is coupled to a base 38 at a second end 36 of the robotic arm 14. The base 38 can be movable (e.g., via one or more wheels) or the base 38 can be configured for fixed, static placement in a workspace environment. According to some aspects, the second end 36 of the robotic arm 14 can be configured to rotate and/or translate relative to the base 38 (e.g., via one or more actuators). The robotic arm 14 includes a plurality of links 16 coupled to one another by a plurality of joints 18 as described above.

The robot system 10' further includes a controller 22 that is communicatively coupled to the gripper 12' and the robotic arm 14 and one or more sensors (not shown) as described above. Although the controller 22 is illustrated as having a separate housing from the robotic arm 14 and the base 38, it is contemplated that the controller 22 can be integrated with or embedded in the robotic arm 14 and/or the base 38 according to alternative aspects of the present disclosure.

As shown in FIG. 2, the robot system 10' further includes an input/output device 32 in the form of a portable tablet computer. The input/output device 32 is communicatively coupled to the controller 22 so as to facilitate operation of the robot system 10 according to various aspects such as those described above for the input/output device 32.

Figure 3B:
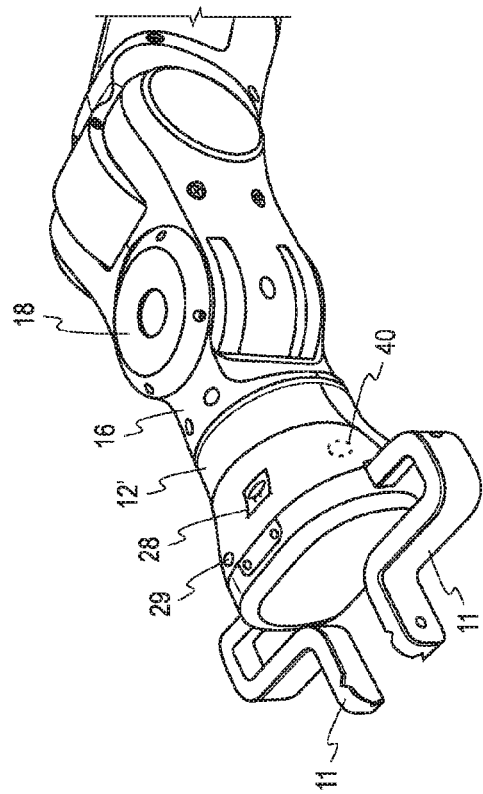
FIGS. 3A-3B illustrate enlarged views of a gripper for the robot system illustrated in FIG. 2 according to different states of actuation.
Figure 3A:
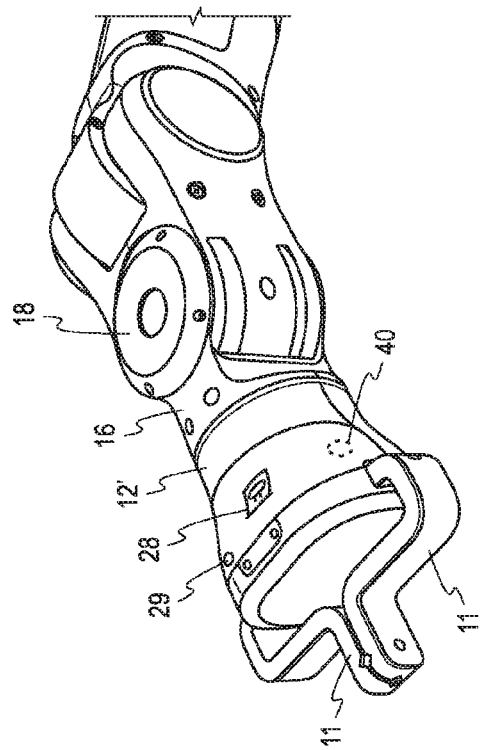

FIGS. 3A-3B illustrate an enlarged view of the gripper 12' coupled to the robotic arm 14. As shown in FIGS. 3A-3B, a control switch 28 is located on the gripper 12'. According to some aspects, the location of the control switch 28 on the gripper 12' can be configured so as to facilitate a preferred hand placement of the operator on the gripper 12' for physically grabbing and manually maneuvering the gripper 12' during training. For example, the location can of the control switch 28 can be located such that the palm of the operator's hand is positioned on a contoured portion of the gripper 12' when the operator's index or middle finger are positioned on the control switch 28.

As shown in FIG. 3A, the control switch 28 is shown in a closed-switch position and the gripper-fingers 11 are positioned in a closed-gripper position such that the gripper 12' is fully closed. FIG. 3B illustrates the control switch 28 actuated to an open-gripper position and the gripper-fingers 11 responsively actuated to an open-gripper position such that the gripper 12' is fully open. In the illustrated example, the control switch 28 is an analog control switch that is configured such that actuation of the control switch 28 between the closed-switch position and the open-switch position causes a correspondingly proportional amount of actuation to the gripper-fingers 11 between the closed-gripper position and the open-gripper position.

In the illustrated example, the control switch 28 is oriented on the gripper 12' such that actuating the control switch 28 towards the gripper 12' closes the gripper-fingers 11 and actuating the control switch 28 away from the gripper 12' opens the gripper-fingers 11. This configuration can provide a more intuitive interface, which allows the operator to easily understand how to actuate the control switch 28 to achieve a desired actuation of the gripper 12'. It is contemplated that, according to some aspects of the present disclosure, one or more visual indicia (e.g., arrows) can be provided on or adjacent to the control switch 28 to further facilitate ease of use.

As shown in FIGS. 3A-3B, the gripper 12' can optionally include a mark button 29 configured to assist in facilitating the training mode as will be described in further detail below.

III. Example Training Process

Figure 4:
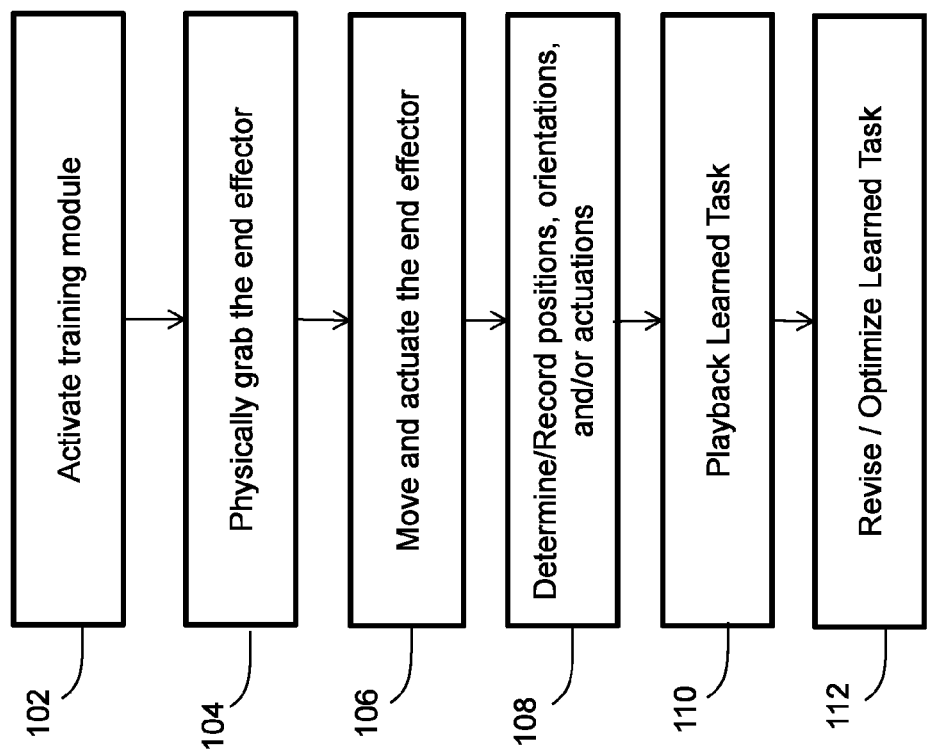
FIG. 4 illustrates an example flowchart for a process of training a robot system to perform one or more tasks according to aspects of the present disclosure.

Referring now to FIG. 4, a flowchart is illustrated for an example process 100 of training the robot system 10 (or the robot system 10') to learn a new task or supplement a previously learned task according to aspects of the present disclosure. At block 102, the training module 24 is activated to transition the robot system 10 to the training mode. For example, the robot system 10 can be transitioned to the training mode in response to an input received by the controller(s) 22 from one of the input/output devices 32. According to some aspects, the robot system 10 can be transitioned to the training mode to teach the robot system 10 an entirely new task. According to additional or alternative aspects, the robot system 10 can be transitioned to the training mode during task execution so as to supplement or revise a previously learned task. In such situations, the operator can interrupt operation of the robot system 10 in the execution mode to transition the robot system 10 to the training mode (e.g., via the input/output device 32).

In the training mode, the robot system 10 can be configured to be operated in a gravity-compensated mode to facilitate manual movement and manipulation of the end-effector 12 and the robotic arm 14 by the operator. In the gravity-compensated mode, the controller(s) 22 provide control signals to the actuators 13 and/or the arm actuators 20 to counteract the forces of gravity so as to provide the operator with the sensation that the robot system 10 is relatively weightless. This facilitates easy movement by the operator of the end-effector 12 and the robotic arm 14 during the training mode.

According to one non-limiting example, the controller(s) 22 can be configured to provide control signals to the actuators 13 and/or the arm-actuators 20 to counteract gravity for the end-effector 12 and the links 16 based on a stored digital model of mass distribution for end-effector 12 and the robotic arm 14. The control signals can be further based on an instantaneous kinematic analysis by the training module 24 using signals received from the sensors 30 as inputs to kinematic models and algorithms representative of the robot system 10.

Once the robot system 10 is transitioned into the training mode, the operator physically grabs the end-effector 12 at block 104. For instance, the operator can physically grab the end-effector 12 such that his or her fingers are located on or adjacent to the control switch 28.

At block 106, the operator then moves and actuates the end-effector 12 as desired to perform the task(s) to be taught to the robot system 10. For example, grabbing the end-effector 12, the operator can maneuver the end-effector 12 along a desired path, while actuating the end-effector 12 at one or more points along the path. Because the control switch 28 is located on the end-effector 12, the operator need not step away or even remove his or her hands from the end-effector 12 throughout the entire training of the task. The integration of the control switch 28 with the end-effector 12 can thus facilitate more efficient and rapid training of the robot system 10. In some instances, the operator can even actuate the control switch 28 while moving the end-effector 12 during training.

In one example implementation, the operator can teach the robot system 10 to move an object from a first location to a second location by first manually guiding the end-effector 12 to the first location and into alignment with the object. Once aligned, the operator can actuate the control switch 28 on the end-effector 12 to close a pair of gripper fingers around the object. With the object within the grasp of the gripper, the operator can then move the end-effector 12 to the second location. At the second location, the operator can actuate the control switch 28 to release the object from the end-effector 12 and then proceed to further desired actions, if any, for the task. Notably, because the control switch 28 is located on the end-effector 12, the operator would not need to step away from or remove his or her hands from the end-effector 12 throughout the entire training of the task.

As the end-effector 12 is moved and actuated, the sensors 30 detect such actions and responsively provide input signals to the training module 24. At block 108, the training module 24 processes the input signals, e.g., based on kinematic models and/or equations, to determine and record the positions, orientations, movements, and/or actuations of the end-effector 12 and/or the robotic arm 14. For example, the training module 24 can be configured to determine, based on the input signals, one or more coordinates for the end-effector 12, the links 16, and/or the joints 18. The coordinates can be Cartesian coordinates, cylindrical coordinates, spherical coordinates, and/or the like. Additionally or alternatively, for example, the training module 24 can be configured to determine, based on the input signals, forces (to be applied by the actuators 13 and/or the arm actuators 20) calculated to move the end-effector 12 and the robotic arm 14 along particular paths to particular positions. In other words, the training module 24 can be configured to determine parameters that can be subsequently utilized by the execution module 26 to implement the learned task in a position control mode and/or a force control mode.

According to some aspects of the present disclosure, the training module 24 can process the input signals and record the positions, orientations, movements, and/or actuations of the end-effector 12 and the robotic arm 14 continuously or periodically during the training mode operations. According to additional or alternative aspects of the present disclosure, the training module 24 can be configured to process the input signals and record the positions, orientations, movements, and/or actuations of the end-effector 12 and the robotic arm 14 in response to a mark signal, which the operator selectively causes to be transmitted to the training module 24 at various points during the training mode. For example, the robot system 10 can optionally include a mark button 29 on the end-effector 12, which when actuated causes the mark signal to be provided to the training module 24.

In implementations in which a mark button 29 is employed, the mark button 29 can be located on the end-effector 12 such that the operator can simultaneously operate the mark button 29 and the control switch 28. For example, the mark button 29 and the control switch 28 can be located on the end-effector 12 such that the operator can actuate the mark button 29 with one hand and operate the control switch 28 with the other hand without the operator having to remove either hand to operate either the mark button 29 or the control switch 28. This is yet another reason why locating the control switch 28 on the end-effector 12 is advantageous.

Once the operator has completed the task(s) for the training session, the operator can optionally playback the learned task(s) for review at block 110 (e.g., by initiating a playback mode using the input/output device 32). The learned task(s) can be optionally revised or optimized via the training module 24 at block 112. Such revisions and/or optimizations can be initiated and implemented in response to operator inputs (e.g., via the input/output device 32) and/or in an automated manner by the controller(s) 22. For example, the recorded movement of the robotic arm 14 between two points may include jiggling or may not follow the most direct route. The training module 24 can be configured to modify the recorded trajectory using a filtering scheme to smooth out the trajectory or otherwise shorten the path between the two points.

As described above, the robot system 10 of the present disclosure can be trained to perform one or more tasks by the operator physically grabbing and moving the end-effector 12 itself. In doing so, the operator can more readily and precisely position the end-effector 12 than if the operator was to grab a portion of the robotic arm 14 instead. Additionally, training the robot system 10, 10' by physically grabbing and maneuvering the end-effector 12 allows the operator to be closer to any objects that interact with the end-effector 12 and, thus, have a better view of the relative positions and/or alignments of the end-effector 12 and such objects. Despite these advantages, it should be understood that the operator can choose to grab portions of the robotic arm 14 instead of the end-effector 12 under some circumstances.

In the execution mode, the execution module 26 accesses the data and/or parameters determined by the training module 24 to perform the learned task(s) with minimal or no human interaction. In particular, the execution module 26 processes such data and provides control signals to the actuators 13 and the arm-actuators 20 to move the robotic arm 14 and actuate the end-effector 12 according to the parameters determined via the training mode.

FIG. 4, described by way of example above, represents an example process for training the robot system 10 to perform one or more tasks. It should be understood that the above-described process can omit steps, include additional steps, and/or modify the order of steps presented above. Additionally, it is contemplated that one or more of the steps presented above can be performed simultaneously.

IV. Examples of Additional or Alternative Features

Figure 5:
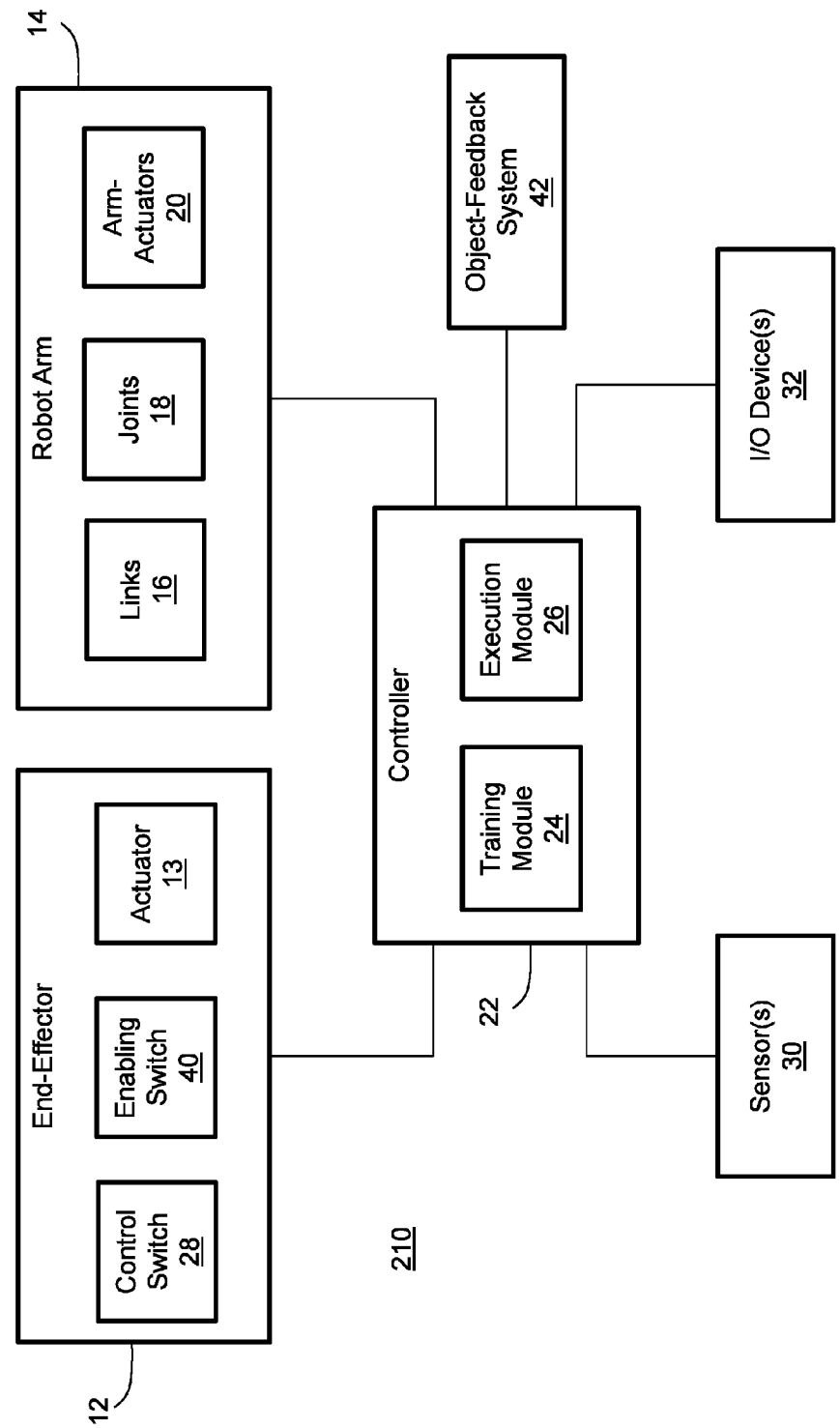
FIG. 5 illustrates a schematic diagram of another example robot system according to additional or alternative aspects of the present disclosure.

Referring now to FIG. 5, a schematic diagram of a robot system 210 is illustrated according to some additional aspects of the present disclosure. The robot system 210 illustrated in FIG. 5 includes all components of the robot system 10 described above for FIG. 1, including the effector 12, the robotic arm 14 with one or more links 16 and one or more joints 18, the one or more actuators 13, the one or more arm-actuators 20, the one or more controllers 22, the training module 24, the execution module 26, the control switch 28, the one or more sensors 30, and the one or more input/output devices 32. As shown in FIG. 5, the robot system 210 also includes an enabling switch 40 and an object-feedback system 42.

As described above, training of the robot system 210 is accomplished by direct user interaction with the robot system 210. Such direct interaction between human and machine presents a number of safety concerns. For example, because the operator operates the robot system 210 in close proximity to the end-effector 12, there is a risk that the operator may be inadvertently harmed by actuation of the end-effector 12. For instance, an operator may unintentionally bump into and actuate the control switch 28. If this caused actuation of the end-effector 12 while the operator was exposed to the implement of the end-effector 12, the operator could suffer minor to potentially severe injuries depending on the circumstances.

To mitigate such risks and substantially improve operator safety, the robot system 210 includes the enabling switch 40. The enabling switch 40 is configured to prevent operation of the end-effector 12 via the control switch 28 unless the enabling switch 40 is simultaneously actuated. Accordingly, the enabling switch 40 can mitigate inadvertent actuation of the end-effector 12 and provide a failsafe to stop actuation of the end-effector 12 in the event that the operator becomes incapacitated.

As one non-limiting example, the enabling switch 40 can be a momentary on/off switch (e.g., a button that only closes the circuit for the control switch 28 when the button is depressed). According to some aspects of the present disclosure, the enabling switch 40 can be located on the end-effector 12. In particular, the enabling switch 40 and the control switch 28 can be located and oriented relative to one another in a manner that facilitates simultaneous actuation of both switches 28, 40 with one hand and/or two hands. For example, the enabling switch 40 can be spaced from the control switch 28 such that the enabling switch 40 can be actuated by an operator's thumb while the operator simultaneously actuates the control switch 28 with an index or middle finger on the same hand.

As noted above, the robot system 210 can also include an object-feedback system 42. The object-feedback system 42 is configured to provide to the operator an indication relating to the interaction between the end-effector 12 and an object. For example, the end-effector feedback system 42 can be configured to indicate to the operator an amount of force that is applied to an object by the end-effector 12. In such examples, the sensors 30 can be configured to detect an amount of force that is applied by the end-effector 12 to the object. For instance, the sensors 30 can include one or more force sensors located on one or more gripper-fingers 111 of a gripper end-effector 12. As another example, the object-feedback system 42 can include one or more temperature sensors configured to detect a temperature of an object with which the end-effector 12 is interacting. More generally, the object-feedback system 42 can be configured to detect object-parameters via one or more of the sensors 30 and provide feedback signals to the controller(s) 22 to process such signals and determine relevant feedback information to be conveyed to the operator. Based on the received feedback information, the operator can make an informed decision whether and/or how to adjust the actuation of end-effector 12 via the control switch 28.

According to various aspects of the present disclosure, the feedback information can be provided to the operator as visual indications, audio indications, and/or haptic indications. For example, the object-feedback system 42 can include a display device configured to display the feedback information to the operator. The display device can be configured to display, for example, the force applied by the end-effector 12 to the object in pounds per square inch (psi) or newtons. According to some aspects, the display device can be located on the end-effector 12 and/or the robotic arm 14 for convenience and efficiency reasons. According to additional or alternative aspects, the display device can be a wearable smart device (e.g., a watch) communicatively coupled to the controller(s) 22. According to other additional or alternative aspects, the display device can be located remotely relative to the end-effector 12 and/or the robotic arm 14, but preferably in a location that allows the operator to train the robot system 10 without having to step away (or, in some cases, remove his or her hands) from the end-effector 12. It is contemplated that, according to some examples, the display device for the object-feedback system 42 can be one or more of the input/output devices 32 (e.g., the tablet computer 32 illustrated in FIG. 2).

In implementations employing audio feedback, the object-feedback system 42 can include one or more speakers configured to provide, for example, auditory readouts of relevant information to the operator. According to other examples, the speakers can be configured to generate a plurality of different sounds and each of the different sounds can be associated with a different message for the operator. For instance, a first sound with a high pitch can mean that too much force is being applied to the object and a second sound with a low pitch can mean that not enough force is being applied to the object. According to still other examples, the audio cues can be provided via a plurality of different sound patterns.

In haptic feedback implementations, the object-feedback system 42 can include one or more haptic actuators configured to provoke operator stimulation through the sense of touch. Thus, the haptic actuator(s) can provide a mechanism for exchanging information that replaces or supplements auditory and visual forms of communication. According to some examples, the haptic actuator(s) can be actuated according to various haptic profiles. The haptic profiles can include information relating to the frequency, intensity, and/or relative synchronizations for actuating the haptic actuator(s). In particular, distinct haptic profiles can be associated with different aspects of the interaction between the end-effector 12 and the object such that, by learning to recognize the different haptic profiles, the operator can receive information about the interaction through haptic stimulation.

For instance, the haptic actuator(s) can be configured to increase the frequency and/or intensity of the haptic stimulation as the force applied by the end-effector 12 to the object increases. Similarly, the haptic actuator(s) can be configured to decrease the frequency and/or intensity of the haptic stimulation as the force applied by the end-effector 12 to the object decreases. Based on the haptic profiles received by the operator from the haptic actuator(s), the operator can increase or decrease the actuation of the end-effector 12 accordingly (e.g., until a predetermined amount of force is applied to the object).

According to some aspects, the haptic actuator(s) are located on or embedded in the end-effector 12. For example, the haptic actuator(s) can be provided on or in a portion of the end-effector 12 where the operator's hand is expected to be placed based on the locations of the control switch 28 and/or the enabling switch 40. By integrating the haptic actuator(s) with the end-effector 12, the operator can receive the feedback information without having to step away (or, in some cases, even remove his or hands) from the end-effector 12. This also facilitates more rapid, efficient, and convenient training of the robot system 210.

According to one non-limiting example, the one or more haptic actuators can include a rotary-motion vibrating haptic actuator, which can include an eccentric mass coupled to a DC motor. Both the motor and the mass can be enclosed in an outer housing that directly or indirectly contacts an operator's skin. The rotation of the mass by the motor causes the housing to vibrate, which in turn is transferred to the operator causing stimulation to the skin.

According to additional or alternative examples, the one or more haptic actuators can include a linear-actuator (i.e., a "voice-coil" actuator). Linear-actuators typically include a movable contacting element that is lightly preloaded against the skin or, in some aspects, can be embedded in a housing. When an electrical signal is passed through the coil, the contacting element oscillates along a path generally perpendicular to the skin.

According to other additional or alternative examples, the one or more haptic actuators can include pneumatic actuators having a "hard" shell with a "soft" membrane covering an opening of the shell. Oscillatory compressed air, which is driven into the hard shell, for example, through an air supply tube, forces the soft membrane to vibrate. The oscillatory compressed-air signals can be generated by, for example, solenoid valves configured to selectively isolate a pressurized air line that is connected to either a compressor or pressurized air tank.

According to some aspects of the present disclosure, the feedback information provided to the operator via the object-feedback system 42 can include or be based on predetermined information about the object. For example, the object-feedback system 42 can store fragility information about the object and, based on the stored fragility information, determine a threshold amount of force that should not be exceeded during the interaction between the end-effector 12 and the object. During training, the object-feedback system 42 can convey the fragility information and/or the threshold amount to the operator. For instance, the object-feedback system 42 can provide one or more haptic profiles to the operator warning that the amount of force applied by the end-effector 12 to the object is approaching or has exceeded the threshold. As another example, the object-feedback system 42 can display a meter that shows how the measured amount of force applied by the end-effector 12 compares to the threshold such that the operator can visually discern how much more the operator can safely actuate the end-effector 12 without damaging the object. It should be understood that numerous other examples are possible as well.

It should be understood that the example process 100 described and illustrated with respect to FIG. 4 can be modified to include one or more additional steps to implement the above-described functionalities of the enabling switch 40 and/or the object-feedback system 42. For example, the process 100 can include an additional step of actuating the enabling switch 40 simultaneously with the control switch 28 to actuate the end-effector 12 during the training mode. Additionally or alternatively, the process 100 can include one or more steps for determining an amount of force applied by the end-effector 12 to an object and providing an indication of the determined amount of force to the operator. The process 100 can further include a step for actuating the control switch 28, based on the indication of the determined amount of force, until a predetermined amount of force is applied to the object. According to still other additional or alternative examples, the process 100 can include one or more steps for determining a force threshold value based on stored information related to the object, and determining that the amount of force applied by the end-effector to the object is greater than the force threshold value so that an indication can be provided to the operator in response to the determination that the amount of force is greater than the force threshold value.

V. Example Controller

The embodiments described herein can employ one or more controllers 22 for processing information and controlling aspects of a robot system 10, 210. For example, in the robot systems 10, 210, the training module 24 operates to learn a task and the execution module 26 operates to execute a learned task. Additionally, the controller(s) 22 are configured to provide other functionalities such as, for example, receive and process signals from the sensor(s) 30 and provide control signals to the actuator(s) 13 and the arm-actuator(s) 20. Meanwhile, the object-feedback system 42 can also include one or more of the controller(s) 22, for example, to facilitate determinations of appropriate feedback information, haptic profiles, thresholds, etc. to provide to the operator. As such, the controller(s) 22 can include one or more processors. For example, the controller(s) 22 can include one or more shared or dedicated processors to provide the modules 24 and 26, process the signals from the sensors 30, provide control signals to the actuator(s) 13 and the arm-actuator(s) 20, and implement the object-feedback system 42.

The processor(s) of a controller 22 can be implemented as a combination of hardware and software elements. The hardware elements can include combinations of operatively coupled hardware components, including microprocessors, communication/networking interfaces, memory, signal filters, circuitry, etc. The processors can be configured to perform operations specified by the software elements, e.g., computer-executable code stored on computer readable medium. The processors can be implemented in any device, system, or subsystem to provide functionality and operation according to the present disclosure. The processors can be implemented in any number of physical devices/machines. For example, the controller 22 can include one or more shared or dedicated general purpose computer systems/servers to provide the modules 24, 26 and other functionalities. Indeed, parts of the processing of the example embodiments can be distributed over any combination of processors for better performance, reliability, cost, etc.

The physical devices/machines can be implemented by the preparation of integrated circuits or by interconnecting an appropriate network of conventional component circuits, as is appreciated by those skilled in the electrical art(s). The physical devices/machines, for example, can include field programmable gate arrays (FPGA's), application-specific integrated circuits (ASIC's), digital signal processors (DSP's), etc. The physical devices/machines can reside on a wired or wireless network, e.g., LAN, WAN, Internet, cloud, near-field communications, etc., to communicate with each other and/or other systems, e.g., Internet/web resources.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one non-transitory computer readable medium or a combination of non-transitory computer readable media, the controller(s) 22 can include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc. A computer readable medium further can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processors can include, or be otherwise combined with, computer-readable media. Some forms of computer-readable media can include, for example, a hard disk, any other suitable magnetic medium, CD-ROM, CDRW, DVD, any other suitable optical medium, RAM, PROM, EPROM, FLASH-EPROM, any other suitable memory chip or cartridge, a carrier wave, or any other suitable medium from which a computer can read.

The controller(s) 22 can also include databases for storing data. For example, the controller(s) 22 can include an object database for storing information on objects with which the end-effector 12 will interact and/or a haptic profile database for storing one or more haptic profiles that can be associated with different feedback information. Such databases can be stored on the computer readable media described above and can organize the data according to any appropriate approach. For examples, the data can be stored in relational databases, navigational databases, flat files, lookup tables, etc. Furthermore, the databases can be managed according to any type of database management software.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method of operating a robot system comprising:
   activating a training mode for the robot system, wherein the robot system includes a robotic arm, an end-effector coupled to the robotic arm, and an analog control switch located on the end-effector;
   receiving, by one or more controllers from a sensor, a first signal indicating a position of the robotic arm as the end-effector is manually moved along a path;
   receiving, by the one or more controllers from the analog control switch, a second signal indicating one or more actuations of the end-effector via the analog control switch at one or more points along the path, wherein each actuation of the end-effector comprises the analog control switch being actuated to a switch position selected from among more than two switch positions to cause a corresponding state of actuation of the end-effector among more than two states of actuation; and recording, using the one or more controllers, the movements of the robotic arm based on the first signal and the actuations of the end-effector based on the second signal.

2. The method of claim 1, further comprising:
after recording the movements of the robotic arm and the actuations of the end-effector in a training mode, activating an execution mode for the robot system; and
responsive to the activating the execution mode, the one or more controllers controlling the robotic arm and the end-effector to cause robotic arm and the end-effector to repeat the movements and the actuations recorded during the training mode.

3. The method of claim 1, wherein robot system further includes an enabling switch configured to prevent operation of the end-effector via the analog control switch unless the enabling switch is simultaneously actuated, and the method further comprises simultaneously actuating the enabling switch and the analog control switch at the one or more points along the path.

4. The method of claim 1, wherein the end-effector is a gripper having a plurality of gripper-fingers, the plurality of gripper-fingers each have a first-gripper position and a second-gripper position, and
wherein the actuating the analog control switch to the selected switch position comprises actuating the analog control switch by an amount between a first-switch position and a second-switch position to cause a correspondingly proportional amount of actuation of the plurality of gripper-fingers between the first-gripper position and the second-gripper position.

5. The method of claim 1, further comprising:
determining an amount of force applied by the end-effector to an object; and
providing an indication of the determined amount of force to the operator.

6. The method of claim 5, further comprising actuating the analog control switch based on the indication of the determined amount of force until a predetermined amount of force is applied to the object.

7. The method of claim 5, wherein providing the indication of the determined amount of force includes providing a haptic indication via one or more haptic actuators located on or embedded in the end-effector.

8. The method of claim 7, wherein the haptic indication has a haptic profile selected from a plurality of different haptic profiles based on the determined amount of force, each of the plurality of haptic profiles being associated with a respective one of a plurality of potential amounts of force.

9. The method of claim 5, further comprising:
determining a force threshold value based on stored information related to the object; and
determining that the amount of force applied by the end-effector to the object is greater than the force threshold value,
wherein the indication is provided in response to the determination that the amount of force is greater than the force threshold value.

10. The method of claim 1, wherein an amount of actuation of the analog control switch is nonlinearly related to an amount of actuation of the end-effector responsive to the actuation of the analog control switch.

11. The method of claim 1, wherein the second signal is an analog signal.

12. A system, comprising:
a robotic arm;
an end-effector coupled to the robotic arm, the end-effector being actuatable among more than two states of actuation; and
an analog control switch located on the end-effector, the analog control switch being actuatable among more than two switch positions;
a sensor configured to generate a first signal indicating a position of the robotic arm; and
one or more controllers communicatively coupled to the sensor and the analog control switch, wherein the one or more controllers are configured to:
receive, from the sensor, the first signal indicating the position of the robotic arm as the end-effector is manually moved along a path,
receive, from the analog control switch, a second signal indicating one or more actuations of the end-effector via the analog control switch at one or more points along the path, wherein the analog control switch is configured such that each actuation of the end-effector comprises the analog control switch being actuated to a switch position selected from among the more than two switch positions to cause a corresponding state of actuation of the end-effector among the more than two states of actuation, and
record the movements of the robotic arm based on the first signal and the actuations of the end-effector based on the second signal.

13. The system of claim 12, wherein the one or more controllers are further configured to control the robotic arm and the end-effector to cause the robotic arm and the end-effector to repeat the recorded movements of the robotic arm and the recorded actuations of the end-effector.

14. The system of claim 12, wherein the end-effector is a gripper having a plurality of gripper-fingers, the plurality of gripper-fingers each have a first-gripper position and a second-gripper position, the more than two switch positions include a first-switch position and a second-switch position, and the analog control switch is configured such that actuating the analog control switch by an amount between the first-switch position and the second-switch position causes a correspondingly proportional amount of actuation of the plurality of gripper-fingers between the first-gripper position and the second-gripper position.

15. The system of claim 14, further comprising an enabling switch that is configured to prevent operation of the gripper using the analog control switch unless the enabling switch is simultaneously actuated.

16. The system of claim 14, further comprising a feedback system configured to determine and provide an indication of an amount of force applied by the gripper to an object in response to the actuation of the analog control switch.

17. The system of claim 16, wherein the feedback system includes a display device configured to provide a visual indication of the amount of force.

18. The system of claim 16, wherein the feedback system includes one or more haptic actuators configured to provide a haptic indication of the amount of force.

19. The system of claim 18, wherein the one or more haptic actuators are located on or embedded in the gripper.

20. The system of claim 19, wherein the haptic indication is a vibration having at least one of an intensity or a frequency that corresponds to the amount of force.

* * * * *